Figure 1:
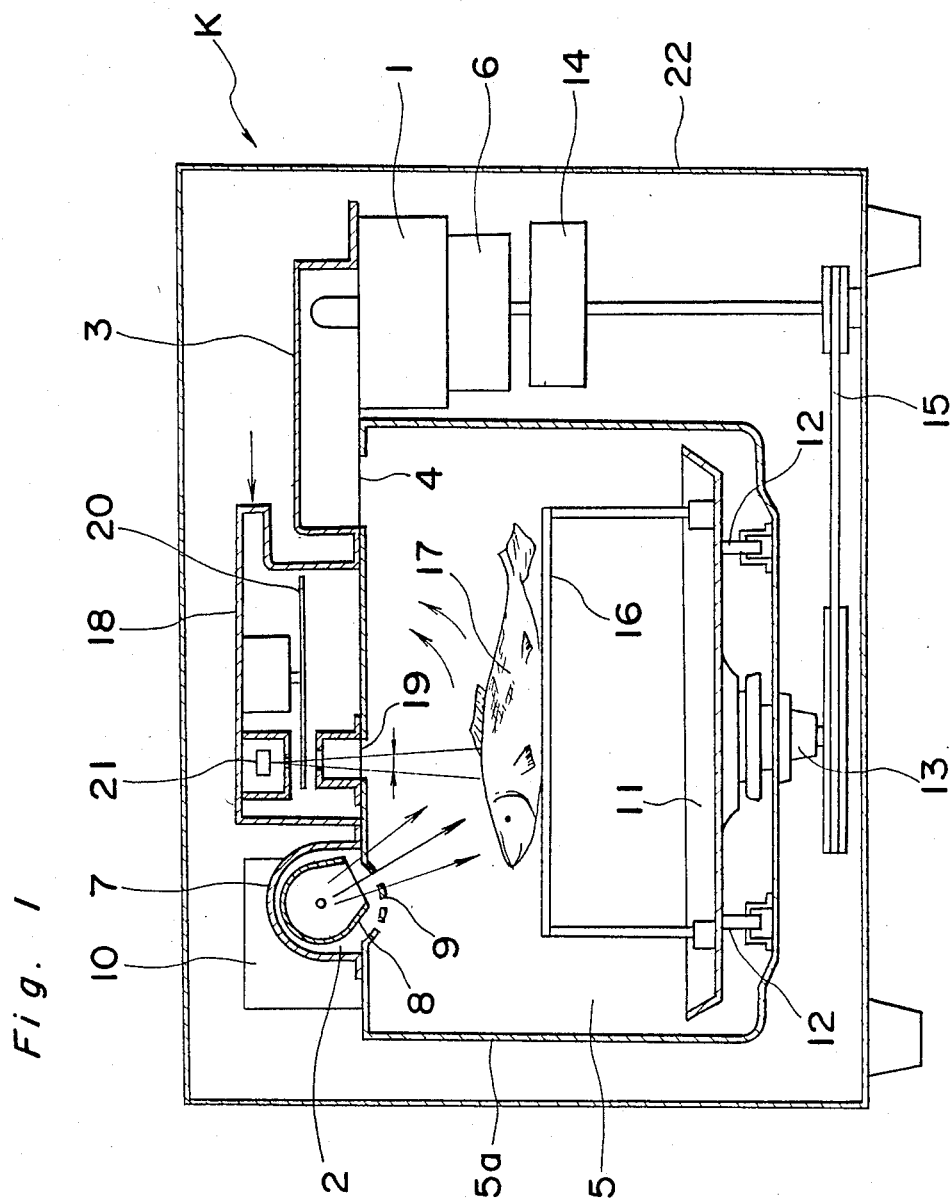

United States Patent [19]

Kojima

[11] Patent Number: 4,499,357
[45] Date of Patent: Feb. 12, 1985

[54] ELECTRONICALLY CONTROLLED COOKING APPARATUS

[75] Inventor: Toshitada Kojima, Ohtsu, Japan

[73] Assignee: Sanyo Electric Co., Ltd., Moriguchi, Japan

[21] Appl. No.: 503,505

[22] Filed: Jun. 13, 1983

[30] Foreign Application Priority Data

Jun. 16, 1982 [JP] Japan ............................ 57-104508

[51] Int. Cl.³ ............................................. H05B 6/68
[52] U.S. Cl. ..................... 219/10.55 B; 219/10.55 R; 219/492; 99/333; 99/325
[58] Field of Search ................ 219/10.55 B, 10.55 E, 219/10.55 R, 10.55 M, 400, 492, 493; 99/328, 333, 325

[56] References Cited

U.S. PATENT DOCUMENTS

| | | | |
|---|---|---|---|
| 3,569,656 | 3/1971 | White et al. | 219/10.55 B |
| 4,154,861 | 5/1979 | Smith | 219/400 X |
| 4,286,134 | 8/1981 | Nakata et al. | 219/10.55 B |
| 4,309,584 | 1/1982 | Terakami | 219/10.55 B |
| 4,390,766 | 6/1983 | Horinouchi | 219/10.55 B |

Primary Examiner—P. H. Leung
Attorney, Agent, or Firm—Armstrong, Nikaido, Marmelstein & Kubovcik

[57] ABSTRACT

An electronically controlled cooking apparatus including a heating source for heating an article to be heated, an infrared sensor for detecting temperature of the article and a control member for controlling drive of the heating source. The control member further includes a first memory for storing a predetermined heating temperature of the article and a second memory for storing a predetermined minimum heating time period for heating the article.

3 Claims, 3 Drawing Figures

ELECTRONICALLY CONTROLLED COOKING APPARATUS

The present invention generally relates to cooking apparatuses and more particularly, to an electronically controlled cooking apparatus in which an article to be heated is heated for cooking through measurement of temperature thereof by an infrared sensor.

It is to be noted that the infrared sensor is arranged to detect surface temperature of the article to be heated in electronically controlled cooking apparatuses of this kind. Consequently, conventional electronically controlled cooking apparatuses have such an inconvenience that, in the case where heating of another article to be heated is started at a rather high atmospheric temperature of a heating chamber after heating of one article to be heated has been completed, the surface temperature of the second article to be heated reaches a finishing temperature too quickly with the result that heating of the second article to be heated is stopped although the inside of the article to be heated is not yet sufficiently heated.

Accordingly, an essential object of the present invention is to provide an improved electronically controlled cooking apparatus in which a predetermined minimum heating time period for heating an article to be heated is set such that heating of the article to be heated is unconditionally continued during the predetermined minimum heating time period after starting of heating of the article to be heated, with substantial elimination of the disadvantages inherent in conventional electronically controlled cooking apparatuses of this kind.

It is desirable that the predetermined minimum heating time period is determined according to kinds of articles to be heated, whereby the articles to be heated are finished to a satisfactory state.

Another important object of the present invention is to provide an improved electronically controlled cooking apparatus of the above described type which is simple in structure, highly reliable in actual use and suitable for mass production at low cost.

In accomplishing these and other objects according to one preferred embodiment of the present invention, there is provided an improved electronically controlled cooking apparatus comprising a heating source for heating, in a plurality of heating modes, an article to be heated, an infrared sensor for detecting temperature of said article and a control means for controlling drive of said heating source in a predetermined one of the heating modes, said control means further comprising: a first memory area for storing a predetermined heating temperature of said article; and a second memory area for storing a predetermined minimum heating time period for heating said article; whereby only in the case where the temperature of said article detected by said infrared sensor reaches said predetermined heating temperature stored in said first memory area and a time period counted from starting of heating of said article by said heating source to heating of said article by said heating source to said predetermined heating temperature exceeds said predetermined minimum heating time period stored in said second memory area, the drive of said heating source is stopped or changeover of the heating modes is effected.

In accordance with the present invention, since the predetermined minimum heating time period for heating the article to be heated is set, the inside of the article to be heated is sufficiently heated such that the article to be heated is finished to a satisfactory state at all times.

Figure 2:
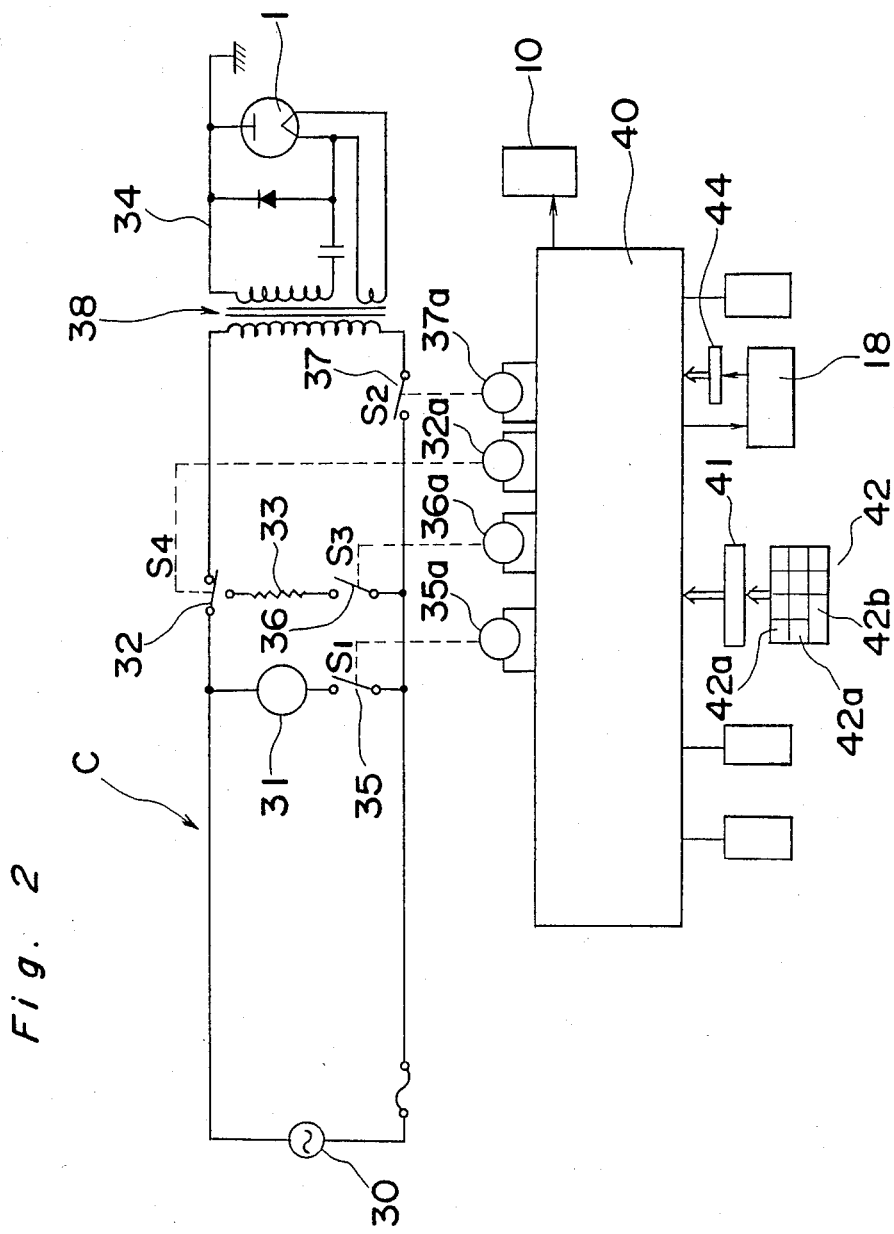
Figure 3:
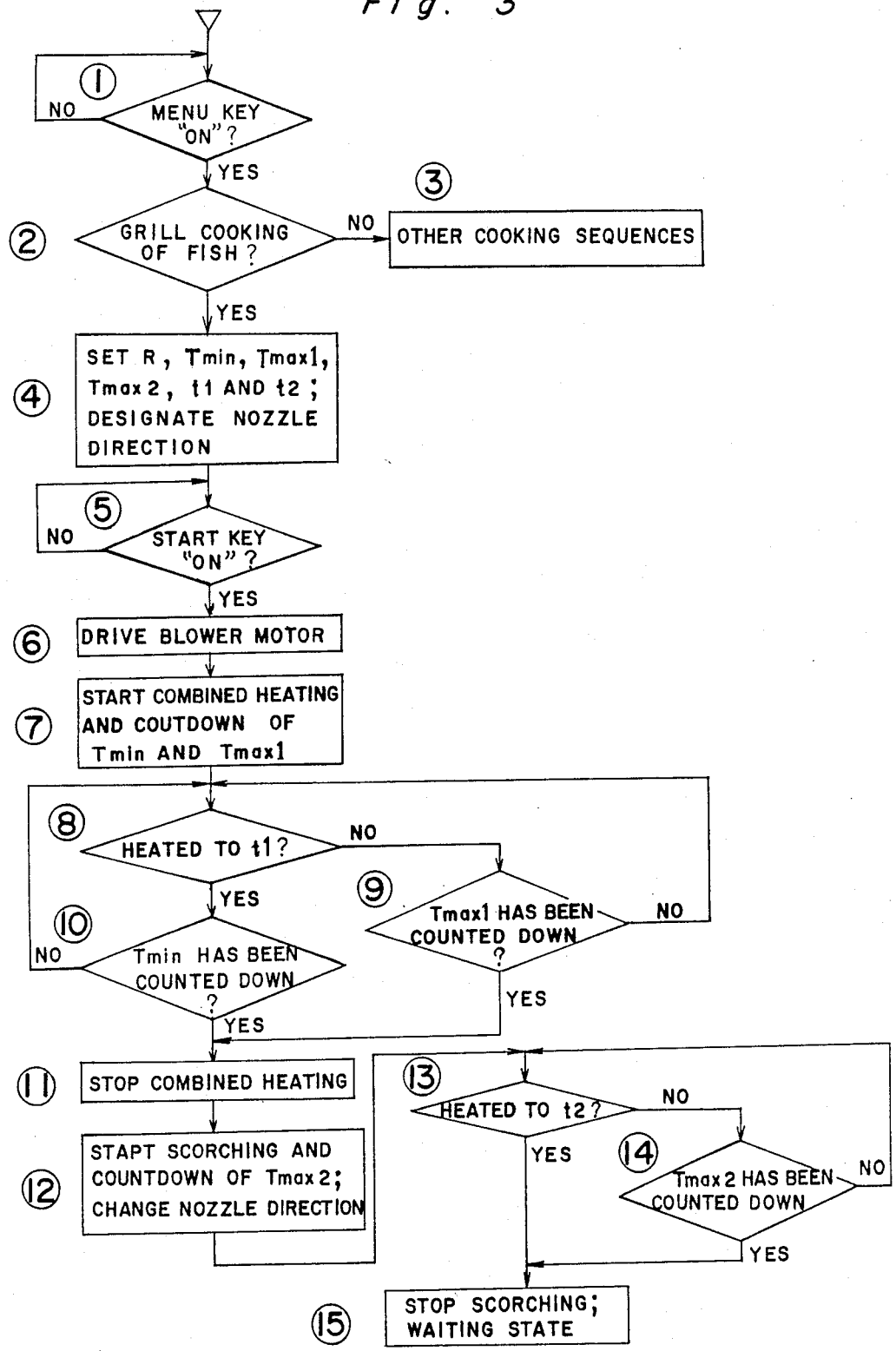

These and other objects and features of the present invention will become apparent from the following description taken in conjunction with the preferred embodiment thereof with reference to the accompanying drawings, in which, FIG. 1 is a cross-sectional view of an electronically controlled cooking apparatus according to the present invention, FIG. 2 is an electrical circuit diagram of the electronically controlled cooking apparatus of FIG. 1, and FIG. 3 is a flow chart showing processing sequences of operations of the electronically controlled cooking apparatus of FIG. 1.

Before the description of the present invention proceeds, it is to be noted that like parts are designated by like reference numerals throughout views of the accompanying drawings.

Referring now to the drawings, there is shown in FIG. 1, an electronically controlled cooking apparatus K according to one preferred embodiment of the present invention.

The electronically controlled cooking apparatus K includes a magnetron 1 acting as a first heating source, a hot air generator 2 acting as a second heating source, a waveguide 3, a microwave introducing port 4, a heating chamber 5 and a blower device 6 which are accommodated in a casing 22. Microwaves produced by the magnetron 1 are supplied into the heating chamber 5 through the waveguide 3 and the microwave introducing port 4. The blower device 6 is arranged to cool the magnetron 1.

The hot air generator 2 includes a fan (not shown), an electric heater (not shown), and a nozzle 8 which are accommodated in a duct 7. In the hot air generator 2, it is so arranged that atmosphere sucked from the heating chamber 5 through a suction port (not shown) formed on a top wall of the heating chamber 5 is heated so as to be converted into hot air such that the hot air is discharged into the heating chamber 5 through the nozzle 8 and an exhaust port 9 which is provided on the top wall of the heating chamber 5 so as to confront the nozzle 8. The fan incorporated in the hot air generator 2 is driven by a driving force of a motor of the blower device 6 through a belt transmission mechanism (not shown). Meanwhile, directions of the nozzle 8 are set by a positioning means 10 including a plunger solenoid, etc. In the case of grill cooking, the nozzle 8 is directed toward a center of the heating chamber 5 as shown in FIG. 1. On the other hand, in the case of oven cooking, the nozzle 8 is directed toward a side wall 5a of the heating chamber 5, which side wall 5a is disposed adjacent to the nozzle 8.

The electronically controlled cooking apparatus K further includes a turntable 11, a plurality of rollers 12, a driving shaft 13, a reduction gear 14, a belt transmission mechanism 15, a cooking net 16, and an infrared sensor device 18. The turntable 11 is rotatably supported by the rollers 12 provided on a bottom wall of the heating chamber 5 so as to be rotated about the driving shaft 13. The driving force of the motor of the blower device 6 is also used for driving the turntable 11 for rotation thereof so as to be transmitted to the driving shaft 13 through the reduction gear 14 and the belt transmission mechanism 15. The cooking net 16 is placed on the turntable 11 in the case of grill cooking such that an article 17 to be heated is caused to come close to the nozzle.

The infrared sensor device 8 includes a rotary chopper 20 and an infrared sensor 21. In the infrared sensor device 18, it is so arranged that infrared rays entering from pores 19 formed substantially at a central portion of the top wall of the heating chamber 5 are caused to be incident upon the infrared sensor 21 through intermittent interception of the infrared rays by the rotary chopper 20 such that a signal voltage corresponding to surface temperature of the article 17 is produced by the infrared sensor 21.

Hereinbelow, an electrical circuit C of the electronically controlled cooking apparatus K will be described with reference to FIG. 2.

The electrical circuit C includes a commercial power source 30, a blower motor 31 for the blower device 6, a changeover type first relay contact 32, an electric heater 33 incorporated in the hot air generator 2, a microwave oscillation circuit 34, a second relay contact 35, a third relay contact 36, a fourth relay contact 37, a transformer 38, a microcomputer 40 provided with a read-only memory (ROM) and a random access memory (RAM), an interface 41, a key board 42, and an A/D converter 44. The microwave oscillation circuit 34 is connected to the commercial power source 30 through the transformer 38. Electric power of the commercial power source 30 is supplied to the blower motor 31 and is selectively supplied, through the first relay contact 32, to the electric heater 33 and the microwave oscillation circuit 34 including the magnetron 1. The second relay contact 35, the third relay contact 36 and the fourth relay contact 37 are arranged to control electrical conduction to the blower motor 31, the electric heater 33 and the microwave oscillation circuit 34, respectively.

The microcomputer 40 for electronically controlling the electronically controlled cooking apparatus K is arranged to drive a first relay 32a, a second relay 35a, a third relay 36a and a fourth relay 37a corresponding to the first relay contact 32, the second relay contact 35, the third relay contact 36, and the fourth relay contact 37, respectively on the basis of instructions supplied from the key board 42 through the interface 41 or temperature signals supplied from the infrared sensor device 18 through the A/D converter 44, whereby the first relay contact 32, the second relay contact 35, the third relay contact 36 and the fourth relay contact 37 are actuated and the directions of the nozzle 8 are set by the positioning means 10. The key board 42 is mounted on an operating panel of the electronically controlled cooking apparatus K and is provided with a plurality of menu keys 42a and a start key 42b. The microcomputer 40 stores in the ROM heating programs for a plurality of corresponding menus in advance. Accordingly, when one of the menu keys 42a is operated, a heating program corresponding to the one of the menu keys 42a is read out from the ROM such that cooking corresponding to the one of the menu keys 42a is performed automatically by the electronically controlled cooking apparatus K.

Hereinbelow, processing sequences of operations of the electronically controlled cooking apparatus K will be described with reference to FIG. 3 showing the heating program.

In a waiting state, at a step 1, a decision is made as to whether or not any one of the menu keys 42a is operated. In the case of "YES" at the step 1, a decision is made at a step 2 as to which one of the menu keys 42a is operated at the step 1. It is to be noted that the electronically controlled cooking apparatus K is applied to grill cooking of fishes in this embodiment. Accordingly, if it is found at the step 2 that a menu key 42a for grill cooking of a fish is operated at the step 1, a step 4 follows. In the case of "NO" at the step 2, cooking corresponding to each of the menu keys 42a other than the menu key 42a for grill cooking of the fish is performed in a known manner at a step 3.

At the step 4, a cyclic period R, a minimum heating time period Tmin, a first maximum heating time period Tmax1, a second maximum heating time period Tmax2, a first finishing temperature t1, a second finishing temperature t2, and a direction of the nozzle 8, all corresponding to the menu associated with the menu key 42a for grill cooking of the fish are read out at a register area of the RAM of the microcomputer 40 from various cooking conditions stored in advance in the ROM. Meanwhile, the minimum heating time period Tmin and the first finishing temperature t1 are set to be smaller than the first maximum time period Tmax1 and the second finishing temperature t2, respectively.

A decision is made at a step 5 as to whether or not the start key 42b of the key board 42 is operated. In the case of "YES" at the step 5, drive of the blower motor 31 is started at a step 6 and then, combined heating using microwave and hot air is started at a step 7. Namely, when the first relay contact 32 is changed over through the cyclic period R of, for example, 12 sec., output of microwave and that of hot air are alternately started. Furthermore, at the step 7, the direction of the nozzle 8 is set to an oven position and countdown of the minimum heating time period Tmin and the first maximum heating time period Tmax1 is started in accordance with time signals.

Subsequently, before the article 17 is heated to the first finishing temperature t1 and the first maximum heating time period Tmax1 elapses after starting of the combined heating at the step 7, the processing sequences are circulated between a step 8 and a step 9, so that the above described combined heating is continued. If it is found at the step 8 that the article 17 has been heated to the first finishing temperature tl, a decision is made at a step 10 as whether or not the minimum heating time period Tmin has elapsed after starting of the combined heating at the step 7. In the case of "YES" at the step 10, the combined heating is stopped at a step 11. The above described processing sequences illustrate a regular cooking in which the inside of the article 17 has been sufficiently heated at the step 11.

On the other hand, in an irregular case where the above described cooking of the article 17 is performed when the heating chamber 5 is still held at a rather high temperature after completion of the preceding cooking, the surface temperature of the article 17 reaches the first finishing temperature t1 while the inside of the article 17 is not yet heated sufficiently. In this case, heating of the article 17 is continued unconditionally by processing at the step 10. Thereafter, after the lapse of the minimum heating time period Tmin, heating of the article 17 is stopped at the step 11. It is to be noted here that, in the case where the article 17 is a fish, the minimum heating time period Tmin is defined as a time period required for bringing the inside of the article (fish) 17 to a minimum heating state in various conditions of the article (fish) 17. Accordingly, cooking of the above described irregular case does not result in a failure by processing at the step 10.

It is further noted that the first maximum heating time period Tmax1 used as a criterion in the step 9 is defined as a time period after the lapse of which further heating of the article (fish) 17 leads to overheating thereof in various conditions of the article (fish) 17. The step 9 is provided for preventing overheating of the article (fish) 17 in the case where the infrared sensor device 18 does not function properly owing to a certain cause and thus, the measured temperature of the article (fish) 17 does not reach the first finishing temperature t1 at all. Thus, if it is found at the step 9 that the first maximum heating time period Tmax1 has been counted down, heating of the article (fish) 17 is stopped at the step 11.

Meanwhile, at the time when the processing sequences proceed to the step 11, the inside of the article 17 is sufficiently heated as described above and then, the surface of the article 17 is scorched. Namely, at a step 12, the direction of the nozzle 8 is set to a grill position such that only hot air is produced and, at the same time, countdown of the second maximum heating time period Tmax2 is started in accordance with time signals.

Thereafter, before the temperature of the article 17 reaches the second finishing temperature t2 and the second maximum heating time period Tmax2 elapses after starting of heating at the step 12, the processing sequences are circulated between a step 13 and a step 14, so that the surface of the article 17 is scorched.

If it is found at the step 13 that the article 17 has been heated to the second finishing temperature t2, all the driving functions including heating are stopped and an internal state of the microcomputer 40 is cleared at a step 15, whereby the electronically controlled cooking apparatus K is set in a waiting state. At this time, the surface of the article 17 is scorched to an optimum degree, whereby grill cooking of the article 17 is completed. Meanwhile, it should be noted that the step 14 is provided in the same manner as the step 9.

In the above described embodiment of the present invention, the heating modes are changed from combined heating to scorching at the step 12 and the step 12 is further followed by the subsequent steps. However, the processing sequences of operations of the electronically controlled cooking apparatus according to the present invention can be stopped at the step 12 according to kinds of the articles to be heated.

As is clear from the foregoing description, in accordance with the present invention, even if heating of a second article to be heated is started at a rather high atmospheric temperature of the heating chamber after heating of one article to be heated has been completed in the electronically controlled cooking apparatus in which the article to be heated is heated for cooking through measurement of temperature thereof by the infrared sensor, such an undesirable phenomenon is eliminated that the surface of the second article to be heated reaches a finishing temperature too quickly with the result that heating of the second article to be heated is stopped although the inside of the article to be heated is not yet sufficiently heated.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. In an electronically controlled cooking apparatus comprising at least a first heating source for heating an article to be heated, an infrared sensor for detecting the temperature of said article to be heated, and a control means for controlling said first heating source, said control means including first memory means for storing a predetermined heating temperature, means for activating said first heating source, and means responsive to said infrared sensor to deactivate said first heating source when said infrared sensor detects the attainment of said predetermined temperature, the improvement comprising:

second memory means in said control means for storing a predetermined minimum heating time period said minimum heating time period being the minimum heating time necessary to heat said article determined in accordance with the nature of said article to be heated;

means for measuring the elapsed time period from the time of activating said first heating source; and means in said control means responsive to said minimum heating time period stored in said second memory means and to said elapsed time measuring means to continue activation of said first heating source when said infrared sensor detects attainment of said predetermined temperature unless said predetermined minimum heating time period has elapsed.

2. In an electronically controlled cooking apparatus as set forth in claim 1, wherein said apparatus includes a first heating source comprising a magnetron for producing microwaves to heat said article in a first mode and a second heating source comprising a hot air generator to heat said article in a second mode and said control means is operative to cycle the heating of said article between said first heating mode and said second heating mode and, after said infrared sensor detects attainment of said predetermined temperature, to continue heating said article in said second mode only, the further improvement comprising:

means in said control means responsive to said second memory means and said elapsed time measuring means to continue to cycle the heating of said article between said first heating mode and said second heating mode after said infrared sensor indicates attainment of said predetermined temperature unless said predetermined minimum heating time period has elapsed.

3. In an electronically controlled cooking apparatus as set forth in claim 1 or claim 2, the further improvement comprising:

third memory means in said control means for storing a predetermined maximum heating time period, said maximum heating time period being the time period after lapse of which further heating of said article leads to overheating, determined in accordance with the nature of said article to be heated; and means in said control means responsive to said third memory means and said elapsed time measuring means to terminate heating of said article by said first heating source when said maximum heating time period has elapsed, even if said infrared sensor has not detected attainment of said predetermined temperature.

* * * * *